(12) United States Patent
Felton et al.

(10) Patent No.: US 10,730,174 B2
(45) Date of Patent: Aug. 4, 2020

(54) OVERHEAD DRILLING APPARATUS

(71) Applicants: J. Reed Felton, Wauwatosa, WI (US);
David J. Buchner, Janesville, WI (US)

(72) Inventors: J. Reed Felton, Wauwatosa, WI (US);
David J. Buchner, Janesville, WI (US)

(73) Assignee: ACCELERATED FASTENING, LLC,
Fitchburg, WI (US)

( * ) Notice: Subject to any disclaimer, the term of this patent is extended or adjusted under 35 U.S.C. 154(b) by 142 days.

(21) Appl. No.: 16/132,758

(22) Filed: Sep. 17, 2018

(65) Prior Publication Data

US 2020/0086470 A1    Mar. 19, 2020

(51) Int. Cl.
| | |
|---|---|
| *B25D 17/30* | (2006.01) |
| *B23B 39/14* | (2006.01) |
| *B25H 1/00* | (2006.01) |
| *B25D 17/08* | (2006.01) |
| *B25D 17/04* | (2006.01) |
| *B23B 41/00* | (2006.01) |

(52) U.S. Cl.
CPC .............. *B25D 17/30* (2013.01); *B23B 39/14* (2013.01); *B25D 17/043* (2013.01); *B25D 17/082* (2013.01); *B25H 1/0035* (2013.01); *B23B 41/00* (2013.01); *B23B 2260/034* (2013.01); *B23B 2260/07* (2013.01)

(58) Field of Classification Search
CPC .... B25D 17/30; B25D 17/043; B25D 17/082; B23B 39/14; B25H 1/0035
USPC .......................................... 173/170, 171, 48
See application file for complete search history.

(56) References Cited

U.S. PATENT DOCUMENTS

| | | | | |
|---|---|---|---|---|
| 2,261,746 | A * | 11/1941 | Seaboly ............... | B25H 1/0057 408/99 |
| 2,720,125 | A * | 10/1955 | Palik .................... | B25H 1/0035 254/106 |
| 5,295,620 | A * | 3/1994 | Cousineau ........... | B25H 1/0035 173/170 |
| 6,095,724 | A * | 8/2000 | Hurt ..................... | B25H 1/0035 408/136 |
| 6,692,201 | B2 * | 2/2004 | Soderman ............ | B25H 1/0064 408/111 |
| 2005/0276670 | A1 * | 12/2005 | Freund ................. | B25H 1/0035 408/129 |

* cited by examiner

*Primary Examiner* — Nathaniel C Chukwurah
(74) *Attorney, Agent, or Firm* — James Earl Lowe, Jr.

(57) ABSTRACT

A drill apparatus including an inner tube, an outer tube slidably received within the outer tube, and a pole extension mechanism. The pole extension mechanism comprises a pole advance gear having pole advance gear teeth, and a drive gear having drive gear teeth, the drive gear being coaxial with and fixedly attached to the pole advance gear so that the two gears rotate together. The pole advance gear teeth are received in aligned spaced apart apertures in the outer tube. The pole extension mechanism further includes a lever arm having an end pivotally mounted on the support collar at a lever arm pivot point coaxial with the drive gear and the pole advance gear. The pole extension mechanism further includes a stop pawl pivotally mounted on the support collar for rotation between where the stop pawl engages the drive gear and prevents downward movement of the pole inner tube relative to the pole outer tube, and where the stop pawl does not engage the drive gear, and a drive pawl piece pivotally mounted on the lever arm near the lever arm end.

12 Claims, 13 Drawing Sheets

FIG. 1
FIG. 2
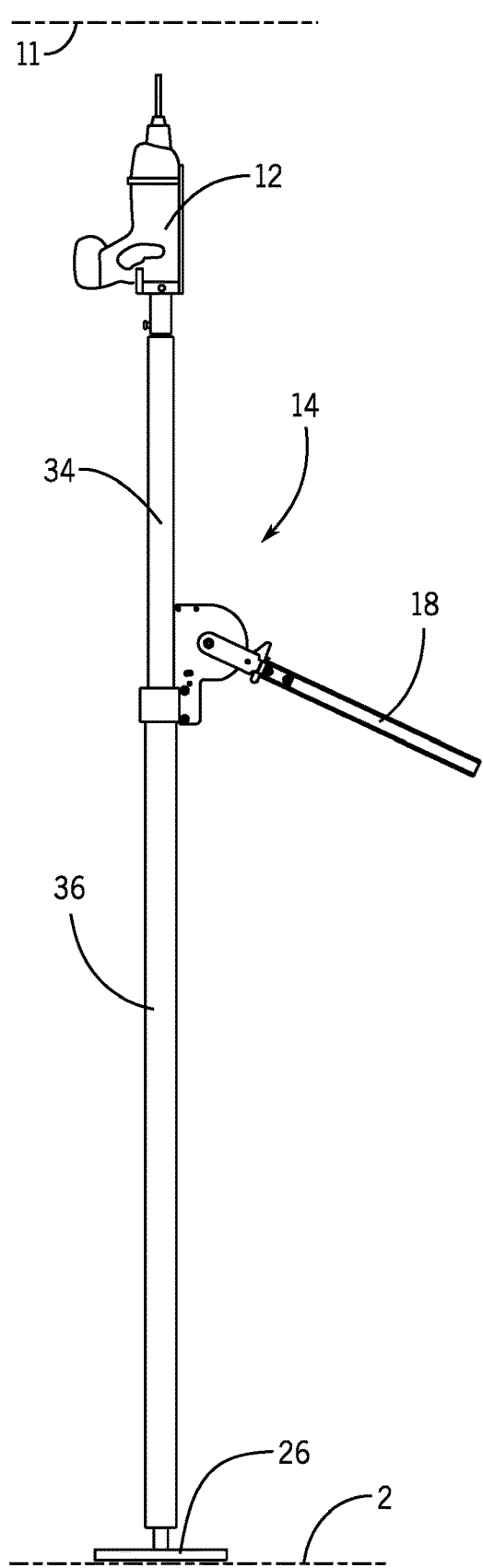
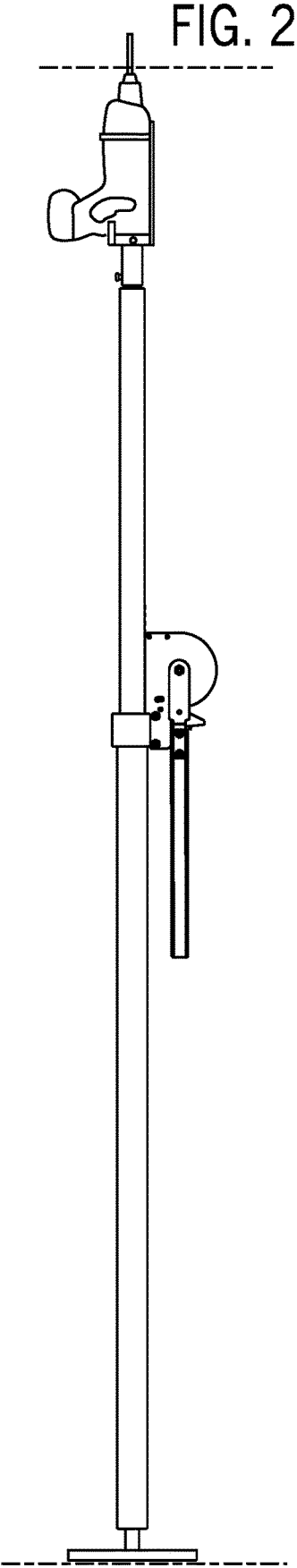

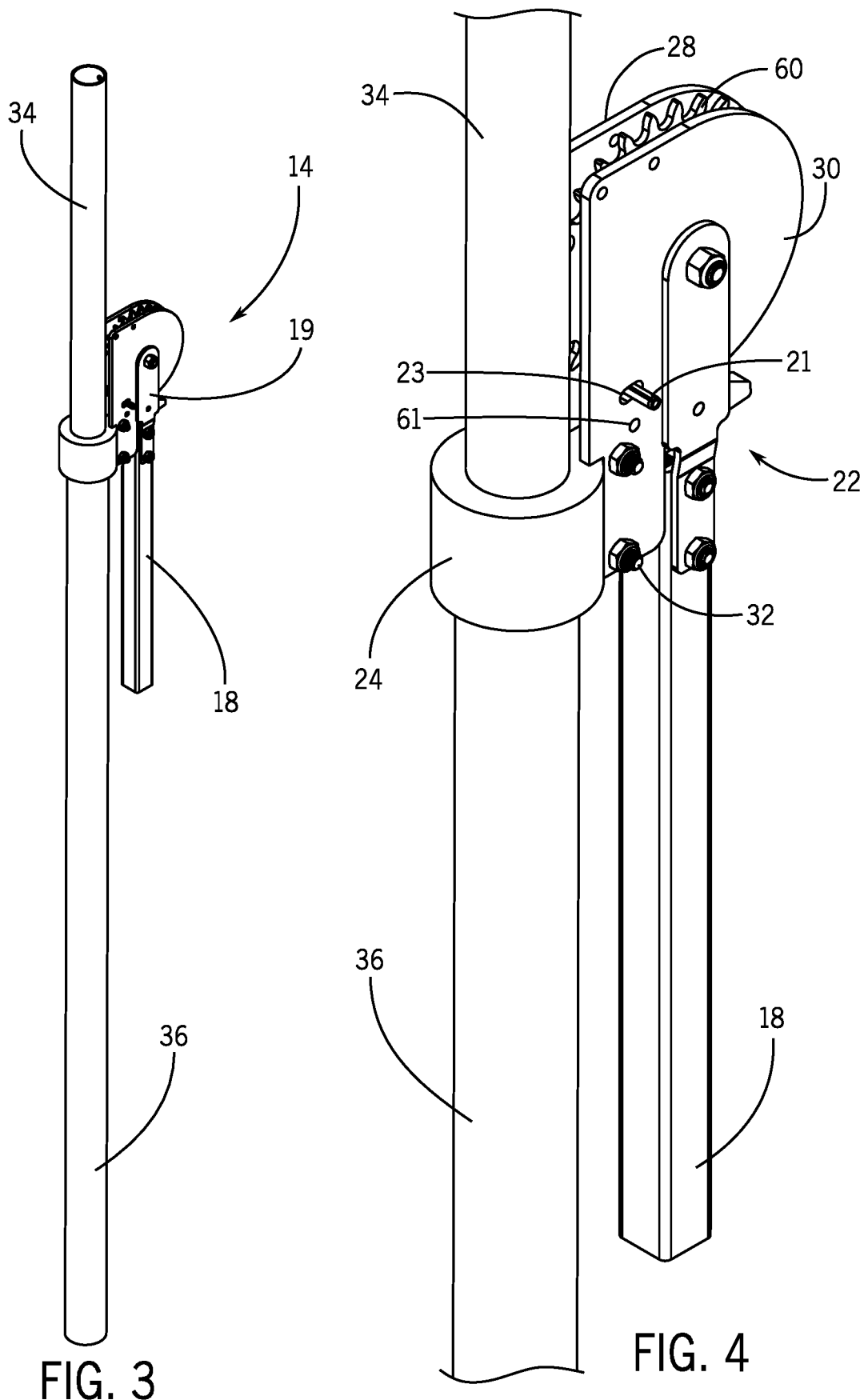

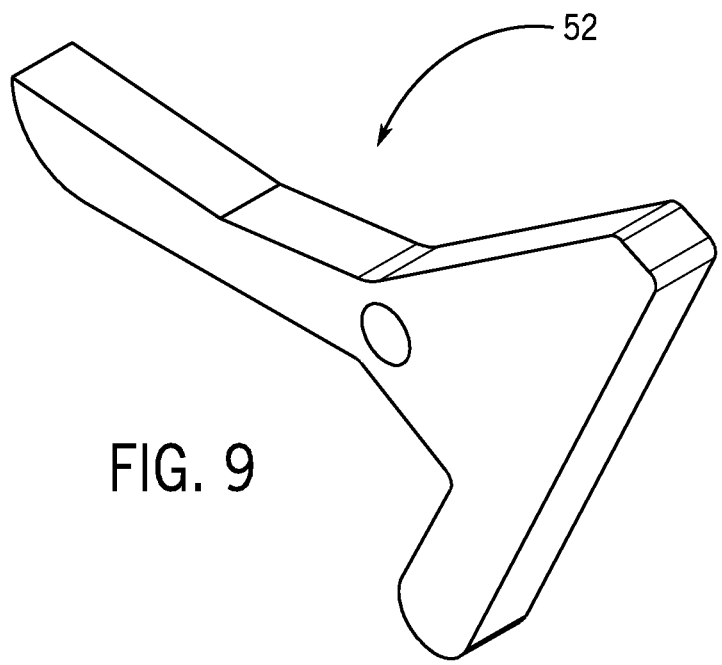
FIG. 9
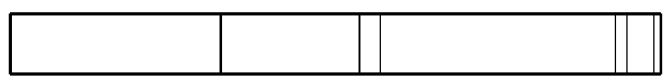
FIG. 10
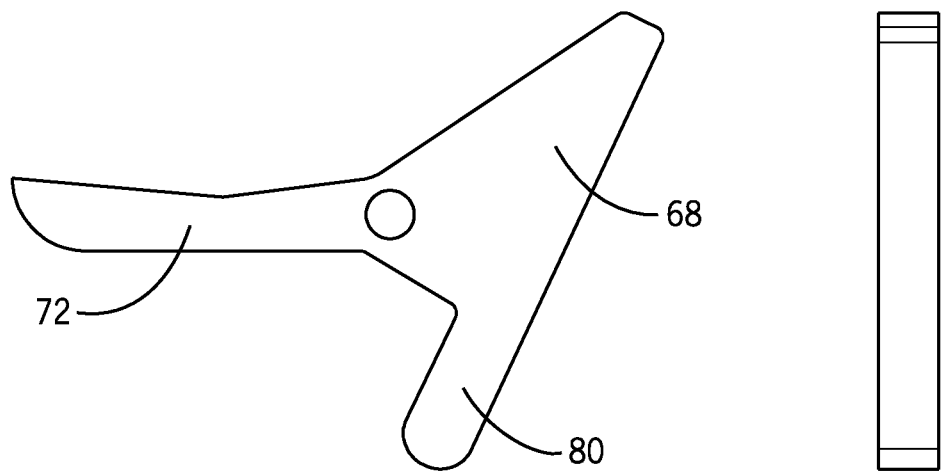
FIG. 11
FIG. 12

US 10,730,174 B2

OVERHEAD DRILLING APPARATUS

FIELD OF THE DISCLOSURE

The present disclosure relates generally to the field of devices and tools that are used to drill holes into ceilings, walls or other overhead structures. It also relates generally to devices and tools that are used to install or attach items to a ceiling. More specifically, it relates to an overhead drilling apparatus that allows an installer, from a position on a floor below the ceiling, to manually position and apply upward vertical motion, bringing pressure to bear, such that holes can be drilled into the ceiling or other overhead structures via an electric drill that is used with the apparatus to form an overhead drilling system.

BACKGROUND OF THE DISCLOSURE

In order to drill holes into an overhead ceiling or other overhead structure, an installer must necessarily elevate his or her body to access the ceiling. This is typically accomplished by the installer using a ladder, stilts, or scaffolding, with an electric drill and other tools in tow. Once elevated, the installer uses the electric drill to drill one or more holes into the ceiling. The installer then pounds a fastener (e.g., a concrete anchor) into the hole, which generally requires the use of two hands. All of this activity requires the elevation of the installer, his or her drilling equipment and his or her fastening accessories.

From a production perspective, conducting this activity in such a fashion consumes precious production time for the installer, which requires the installer to get into position to drill the hole or holes, to properly drill the hole or holes and to then insert and secure the fasteners as needed. This process is repeated for each hole and each hole may or may not be located in close proximity to the other hole or holes. Certainly, even where a number of holes can be drilled into one area of the ceiling, a next adjacent set of accessible holes may likely require the installer to repeatedly move and relocate to another ceiling area until all holes are drilled and all fasteners are secured, as may be desired or required for a particular installation. In short, this method of drilling holes and installing ceiling mounted items is not desirable for the reasons stated.

Accordingly, it is desirable to have an overhead drilling apparatus that simplifies the process of drilling ceiling holes and reduces the number of steps needed to install ceiling mounted items. It is further desirable to have such a drilling apparatus that is easy to use and reduces installer fatigue.

SUMMARY OF THE DISCLOSURE

The drill apparatus of the present disclosure comprises an outer tube and an inner telescoping tube. The outer tube has a lower portion that is disposed at floor level. That lower portion can comprise a foot, a foot hold or other modular accessory that provides suitable support for the lowermost portion of the outer tube, which outer tube is intended to extend upwardly in a substantially vertical direction and in a position that is generally perpendicular to the floor. The outer tube further includes an upper portion having a fixed support collar.

The drill apparatus further includes a pole extension mechanism. The pole extension mechanism comprises a pole advance gear having pole advance gear teeth, and a drive gear having drive gear teeth, the drive gear being coaxial with and fixedly attached to the pole advance gear so that the two gears rotate together. The pole advance gear teeth are received in aligned spaced apart apertures in the outer tube.

The pole extension mechanism further includes a lever arm having an end pivotally mounted on the support collar at a lever arm pivot point coaxial with the drive gear and the pole advance gear. The pole extension mechanism further includes a stop pawl pivotally mounted on the support collar for rotation between where the stop pawl engages the drive gear and prevents downward movement of the pole inner tube relative to the pole outer tube, and where the stop pawl does not engage the drive gear, and a drive pawl piece pivotally mounted on the lever arm near the lever arm end.

This allows the apparatus to be fully adjustable such that the drill atop the apparatus can be used relative to any ceiling height.

Also disclosed is a method for engaging a drill trigger on the drill as it is advanced toward the ceiling with the drill apparatus. The drill includes the drill trigger positioned near the upper tube by a drill support for holding the drill, the drill support being mounted on the upper tube. The method includes the steps of: providing a strand looping over the drill trigger, so that the strand extends toward the lower tube. The strand is attached to the lower tube to secure the strand against movement towards the drill, so that the drill trigger is depressed by the strand when then the upper tube moves relative to the outer tube and towards the ceiling.

The foregoing and other features of the present disclosure will be apparent from the detailed description that follows.

BRIEF DESCRIPTION OF THE DRAWINGS

FIG. 1 is a side elevation view of the apparatus of the present disclosure showing the drill unengaged with a ceiling.

FIG. 2 is a view similar to that shown in FIG. 1 but showing the drill fully engaged with the ceiling and further showing the drill penetrating the ceiling as it would when a hole is drilled into the ceiling.

FIG. 3 is a side perspective view of the drill apparatus shown in FIG. 1.

FIG. 4 is an enlarged view of the pole extension mechanism shown in FIG. 3.

FIG. 9 is a side perspective view of the drive pawl piece.

FIG. 10 is the top view of the drive pawl device.

FIG. 11 is a side view of the drive pawl piece.

FIG. 12 is an end view of the drive pawl piece.

Figure 5:
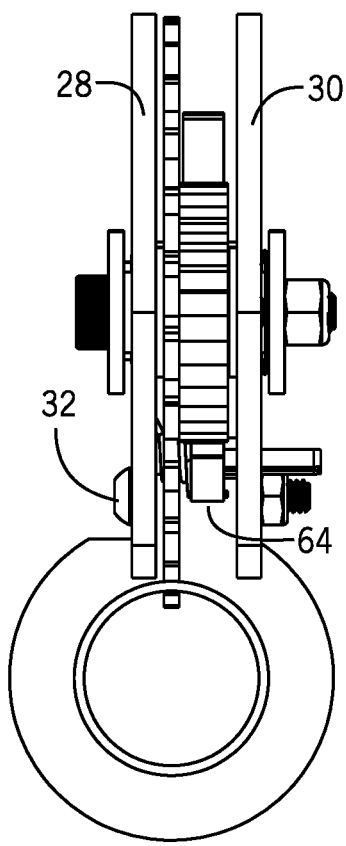
FIG. 5 is a top view of the pole extension mechanism.
Figure 6:
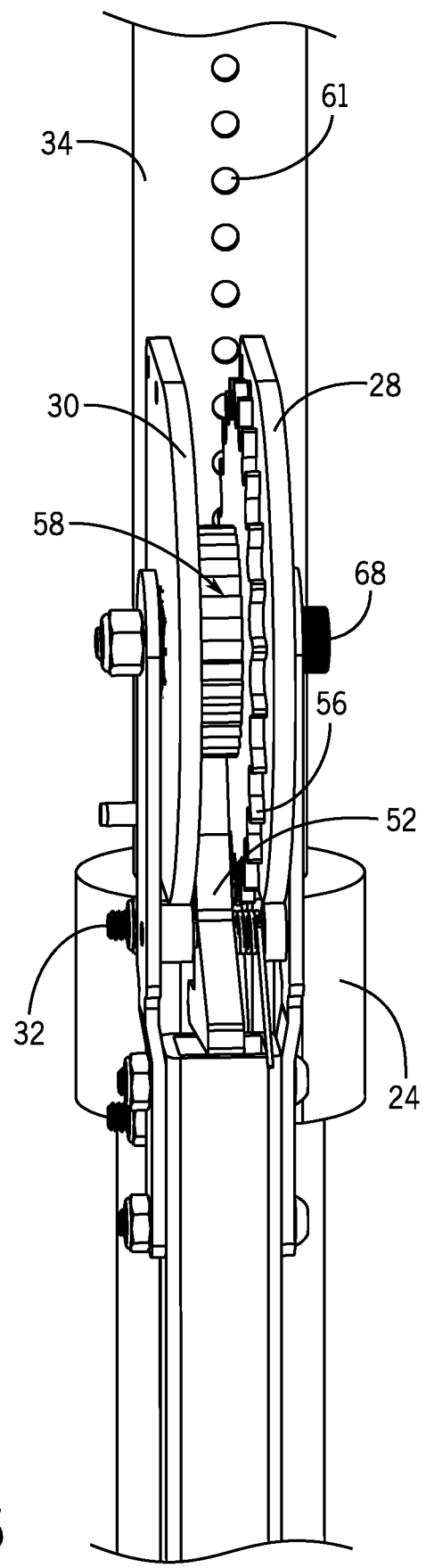
FIG. 6 is a side perspective view of the pole extension mechanism.
Figure 7:
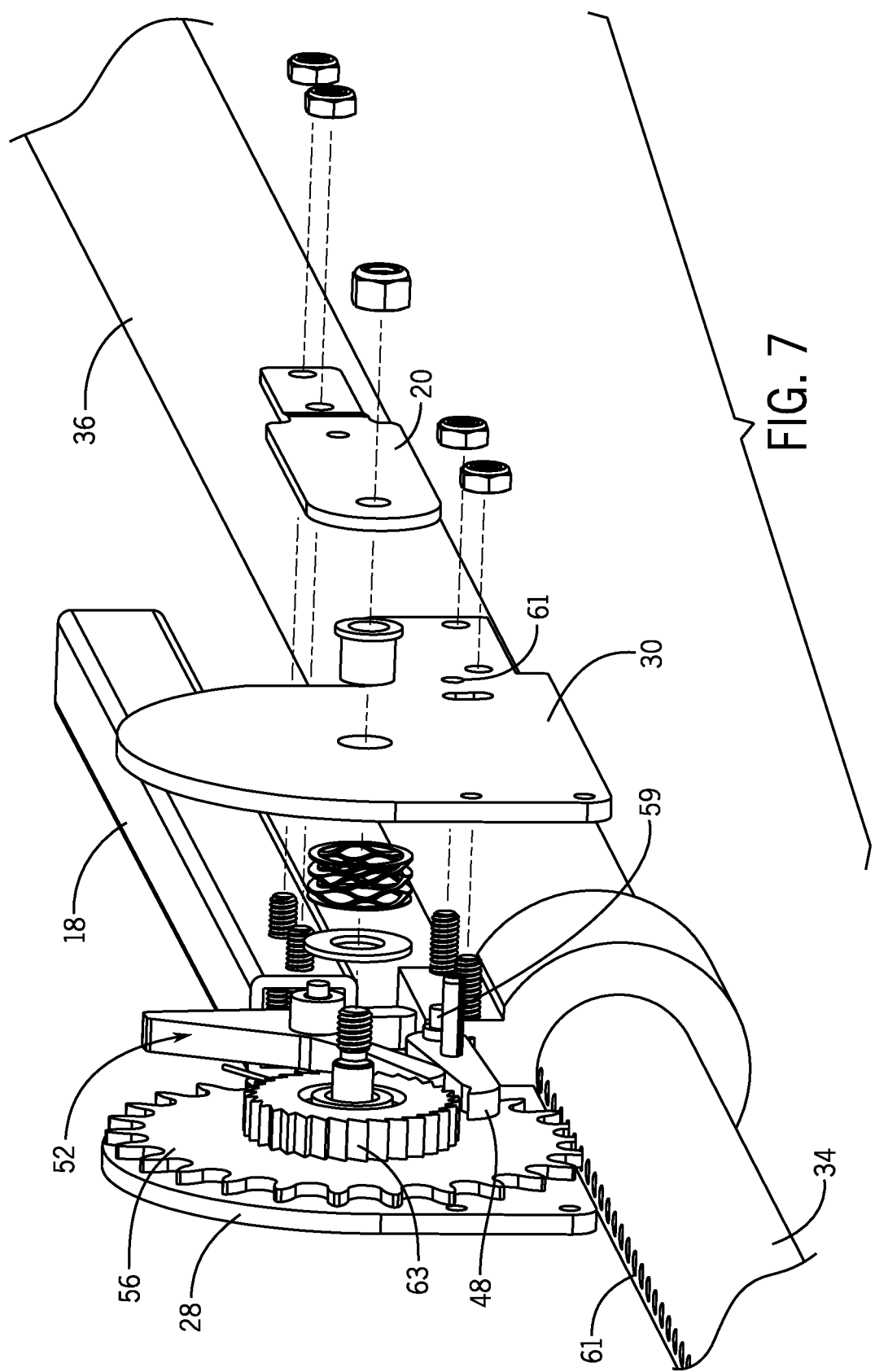
FIG. 7 is a partially exploded side view of the pole extension mechanism.
Figure 8:
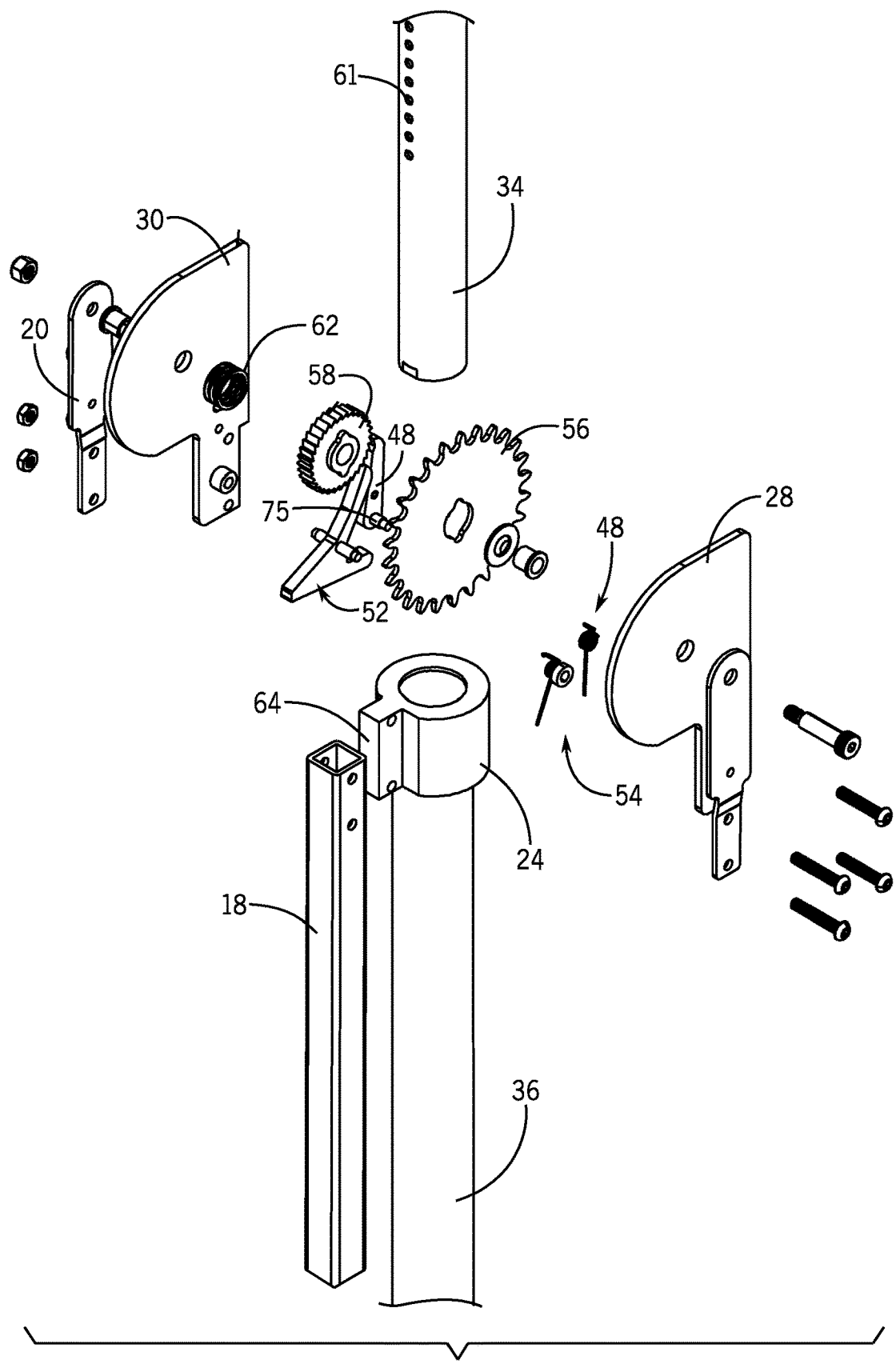
FIG. 8 is a fully exploded view of the pole extension mechanism.
Figure 13:
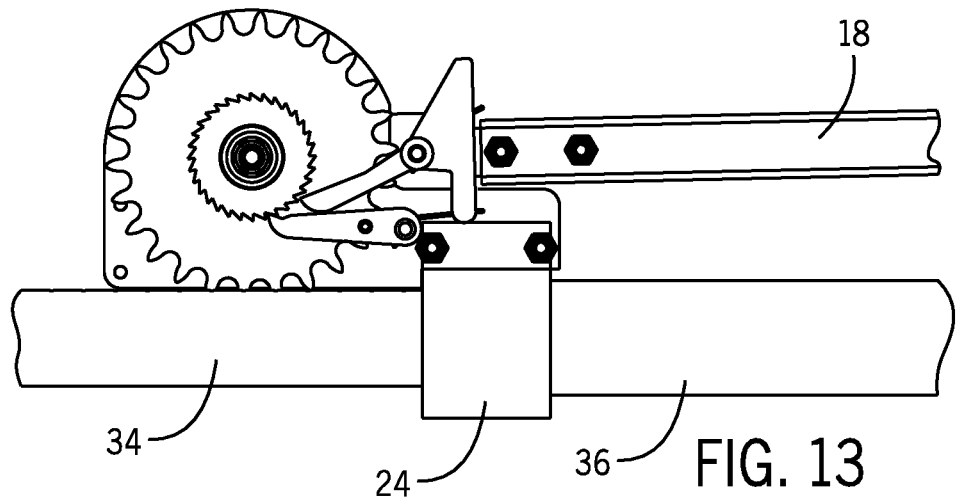
FIG. 13 is the broken way side view of the pole extension mechanism showing the drive pawl piece and stop pawl.
Figure 14:
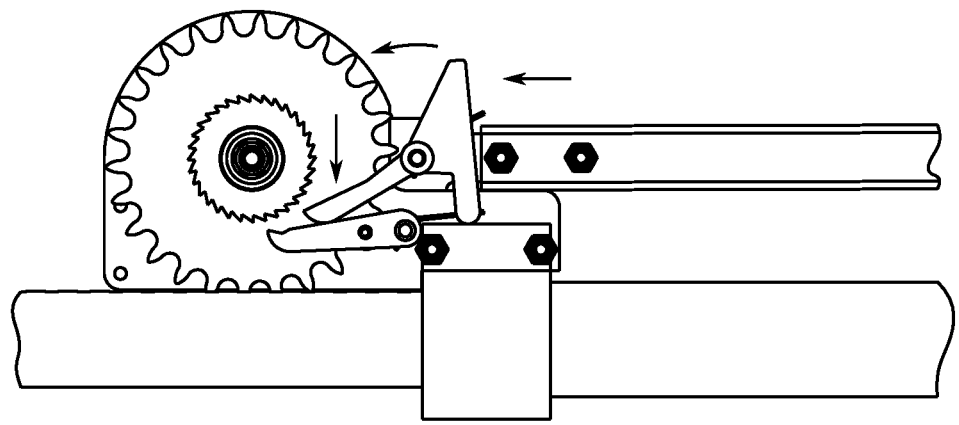
FIG. 14 is another view similar to FIG. 13, showing the drive pawl piece engaging the shoulder on the fixed support collar and moving the stop pawl away from the drive gear.
Figure 15:
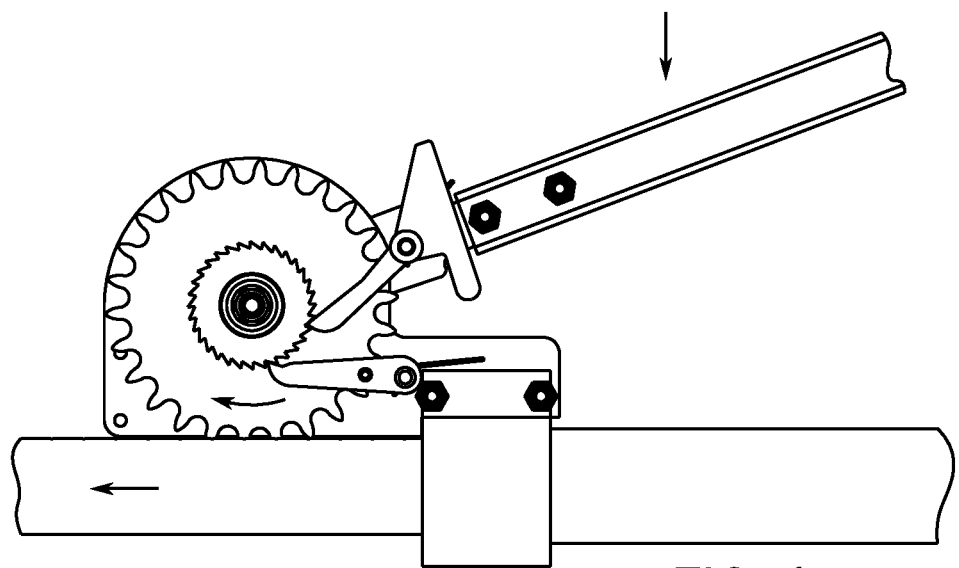
FIG. 15 shows the drive pawl piece advancing the drive gear.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward", "downward", "side", "top" and "bottom", etc., are words of convenience and are not to be construed as limiting terms.

DETAILED DESCRIPTION

Referring now to the drawings in detail, where like numbers represent like elements throughout, FIG. 1 illustrates a side elevation view of an overhead drilling apparatus, generally identified 10, that is constructed in accordance with the present disclosure. The apparatus 10 comprises a lower outer tube 36 and an upper inner telescoping tube 34 attached to a drill 12. In other embodiments (not shown), the lower tube can be an inner tube and the upper tube can be an outer tube. Although the figures show that the tubes 36, 34 are cylindrical in the preferred embodiment, it is to be understood that the present disclosure is not so limited in that regard. The inner telescoping tube 34 is configured to fit in close sliding relationship within the outer tube 36 and to also slide upwardly and downwardly within the outer tube 36, the tubes 36, 34 being disposed in a substantially vertical position. The inner diameter of the outer tube 36 is only slightly larger than the outer diameter of the inner telescoping tube 34. Further, the outer tube 36 comprises an upper portion 40 and a lower portion 44. Extending downwardly from the lower portion 44 of the outer tube 20 is a foot 26, the foot 26 being configured to set atop a portion of a floor 2. At the upper portion 40 of the outer tube 36 is a fixed support collar 24, the collar 24 encircling the outer tube 36.

Although, in the disclosed embodiment, the drilling apparatus 10 is used to drill a hole in a ceiling 11, the drilling apparatus 10 can also be supported so the drilling apparatus is horizontal, in which case the drilling apparatus 10 can be used to drill a hole in a wall (not shown).

The drill apparatus 10 further includes a pole extension mechanism 14 in the form of a rack and pinion style linear actuator or advance mechanism. The pole extension mechanism 14 comprises a pole advance gear 56 having pole advance gear teeth 60, and a drive gear 58 having drive gear teeth 63. The drive gear 58 is coaxial with and fixedly attached to the pole advance gear 56 so that the two gears rotate together. The pole advance gear 56 and drive gear 58 are rotatably mounted on the support collar 24 via a pair of spaced apart side plates 28 and 30 attached to either side of a shoulder 64 that extends radially outward from the support collar 24. Further, the pole advance gear teeth 60 are received in aligned spaced apart apertures 61 in the upper or inner tube 34, the apertures 61 being adapted to mate with the pole advance gear teeth 60. In other words, the pinion is the pole advance gear 58, and the rack is the inner tube 34.

A lever arm 18 has an end 19 attached to and pivotally mounted on the support collar 24 also via the spaced apart support plates 28 and 30 at a lever arm pivot point provided by a lever arm pin 66 coaxial with the drive gear 58 and the pole advance gear 56 and extending between the support plates 28 and 30. More particularly, the lever arm 18 is attached to the support plates 28 and 30 by spaced apart arm attachment brackets 20 attached to the end 19 of the lever arm 18.

A stop pawl 48 is also pivotally mounted on the support collar 24 for rotation between where the stop pawl 48 engages the drive gear 58 and prevents downward movement of the pole inner tube 34 relative to the pole outer tube 36, and where the stop pawl 48 does not engage the drive gear 58. A drive pawl piece 52 is pivotally mounted on the lever arm 18 near but spaced apart from the lever arm end 19, and the drive pawl piece 52 has a drive pawl 72 extending from a drive pawl body 68 adapted to engage the drive gear teeth 63 when moved relative to the drive gear 58 in one direction, and to disengage the drive pawl teeth 63 when moved relative to the drive gear 58 in an opposite direction. In the disclosed embodiment, the one direction is towards the lower outer tube 36, and wherein the opposite direction is away from the outer tube 36.

Rotation of the lever arm 18 in one direction thus causes rotation by the drive pawl 72 of the drive gear 58 and rotation of the pole advance gear 56, thus advancing the inner tube 34 relative to the outer tube 36 via the pole advance gear teeth 60, and pivoting of the lever arm in an opposite direction allows for the drive pawl 72 to freely move over the drive gear 58, and where movement of the lever arm 18 in the one direction causes the drive pawl 72 to engage the drive gear 58.

The support collar shoulder 64 is adjacent the drive pawl device 52, and the drive pawl device 52 has an extension 80 that engages the support collar shoulder 64 when the lever arm 18 is adjacent the outer tube 36, so that when the drive pawl piece 52 rotatably mounted on the lever arm 18 contacts the shoulder 64 on the support collar 24 when the lever arm 18 is brought down to where it is adjacent to the outer tube 36. When that happens, an end of the drive pawl 72 that engages the drive gear 58 moves away from the drive gear 58, allowing for the free rotation of the coaxial drive gear 58 and pole advance gear 56, the drive pawl 72 also engaging the stop pawl 48 and moving the stop pawl 48 away from the drive gear 56.

In other embodiments, this auto release feature can be omitted. When this is the case, then the depending leg or extension 80 on the drive pawl 72 can be eliminated. The drive pawl 72 can be moved into and out of engagement with the pole advance gear 56 by the pawl body 68.

The pole extension mechanism 14 further includes a friction pad 62 on the lever arm pin 66 upon which the lever arm pivots, the friction pad 62 being between the pole advance gear 56 and the side plate 30, and in this embodiment, in the form of a pair of disc springs.

The pole extension mechanism 14 further includes a stop pawl pin release mechanism 22 comprising a pin 21 attached to the stop pawl 48 that extends through a slot 23 in the side plate 30, movement of the pin 21 away from the drive gear 58 moving the stop pawl 48 away from the drive gear 58 to permit free rotation of the drive gear 58.

Further, the end of the drive pawl 72 adjacent the drive gear 58 is biased towards the drive gear 58 by a drive pawl bias spring 54 mounted on a drive pawl pivot pin 75. The drive pawl bias spring 54 is and between the drive pawl piece 52 and the support collar 24, And the end of the stop pawl 48 adjacent the drive gear 58 is biased towards the drive gear 58 by a stop pawl bias spring 50 mounted on a stop pawl peg 61. The stop pawl bias spring 50 is between the stop pawl 48 and the support collar 24.

In the disclosed embodiment, the stop pawl 48 is mounted on the support collar 24 via the stop pawl peg 61 being received in a peg slot 77 in the side plate 30.

In view of the foregoing, it will be apparent that there has been provided an overhead drilling apparatus that simplifies the process of drilling ceiling holes and reduces the number of steps needed to install ceiling mounted items. The overhead drilling apparatus provided is also safe and easy to use and notably reduces installer fatigue.

Figure 16:
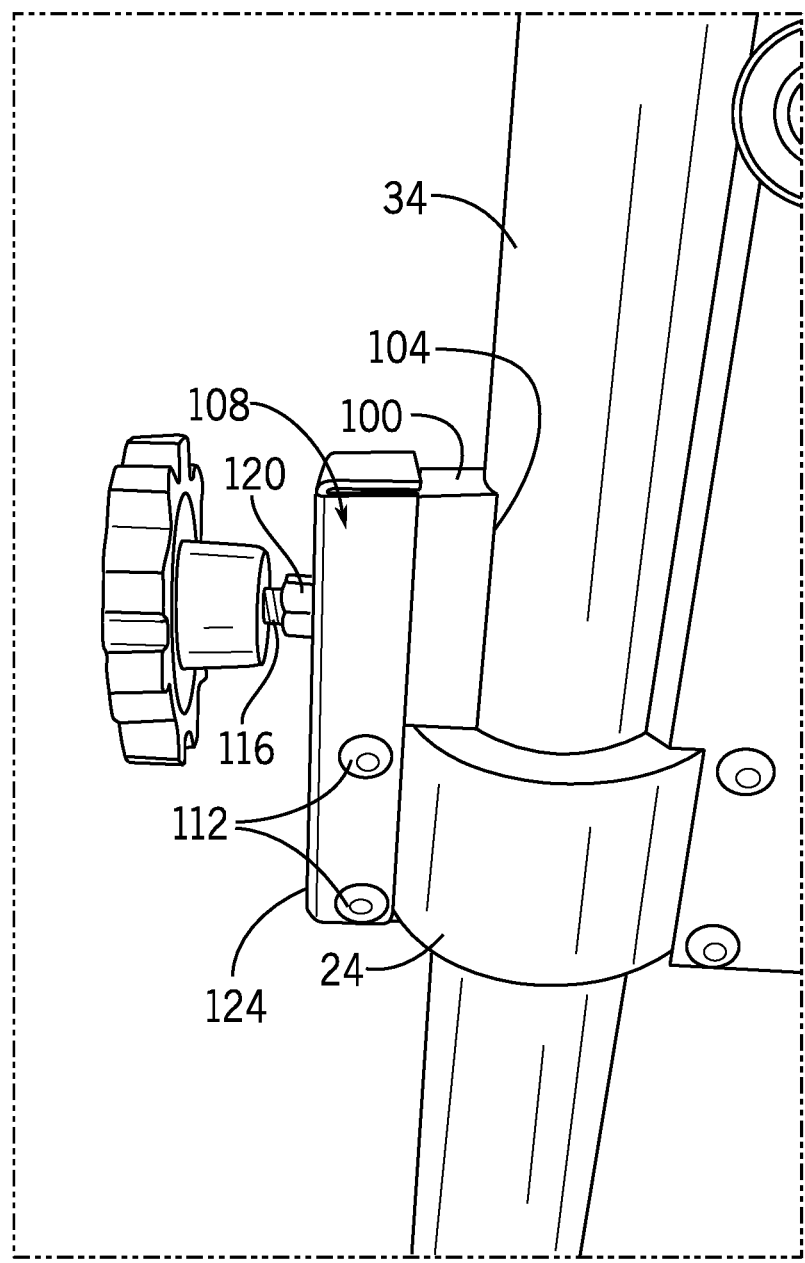
FIG. 16 is a side perspective view of a brake pad attached to the lower tube and engaging an upper tube.
Figure 17:
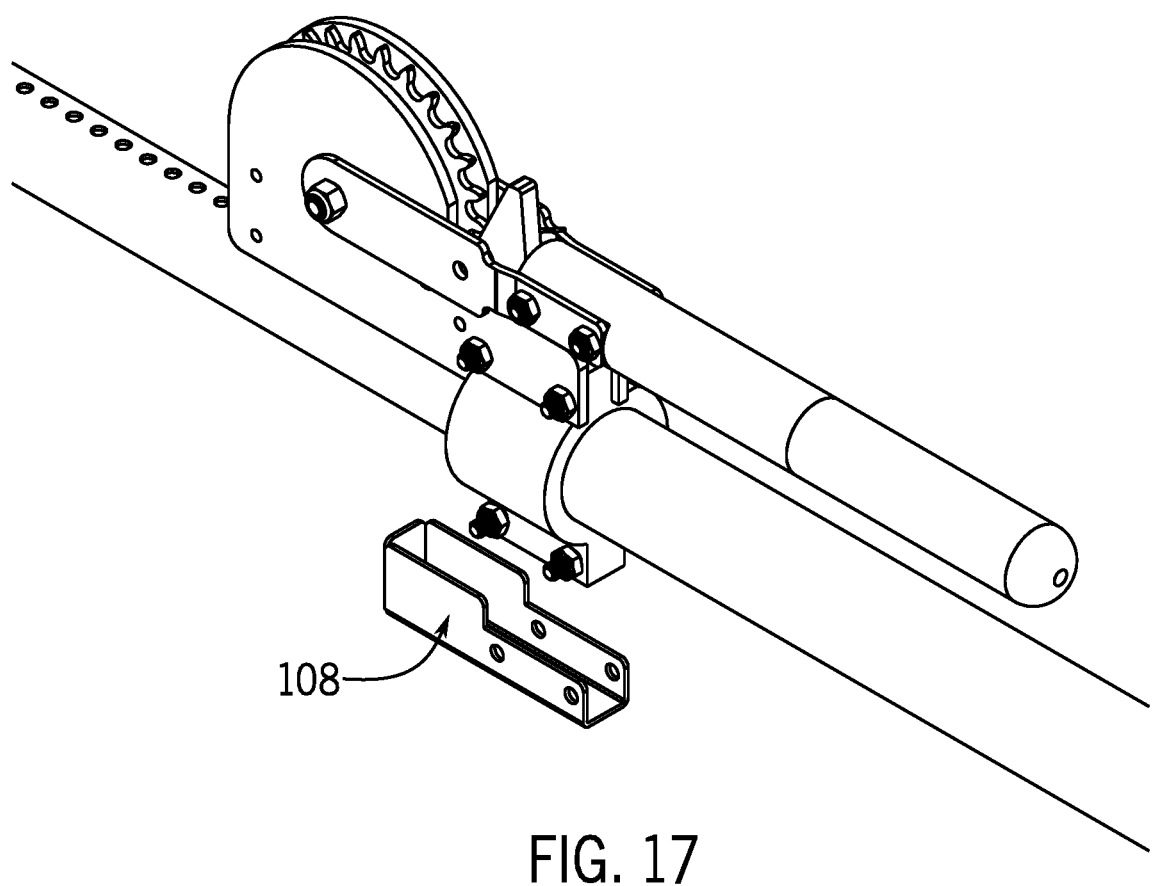
FIG. 17 is a partially exploded side perspective view of the upper tube, lower tube and brake pad holder shown in FIG. 16, without the brake pad.

As illustrated in FIGS. 16 and 17, in an alternate and preferred embodiment, the friction pad 62 can be eliminated, and a brake pad 100 added. The brake pad 100 is elongated and preferably made from rubber, and has a curvature on one side 104 that matches the curvature of the upper tube 34. The brake pad 100 is held in an elongated brake pad holder 108 mounted on the collar 24 by a pair of screws 112. The brake pad holder 108 is elongated and rectangular, and has one of its sides open. The brake pad 100 extends from the open side and is adjacent the upper tube 34. A threaded member 116 extends through a threaded opening 120 in the side 124 of the brake pad holder 108 opposite the open side, and the threaded member 116 engages the brake pad 100. When the threaded member 116 is threaded into the brake pad holder 108, the brake pad 100 is forced against the upper tube 34, and prevents the upper tube 34 from sliding relative to the lower tube 36. When the threaded member 116 is threaded out of the brake pad holder 108, the brake pad 100 is moved away from the upper tube 34, and allows the upper tube 34 to slide relative to the lower tube 36. A handle 130 attached to the threaded member 116 provides ease of rotation of the threaded member 116.

Figure 18:
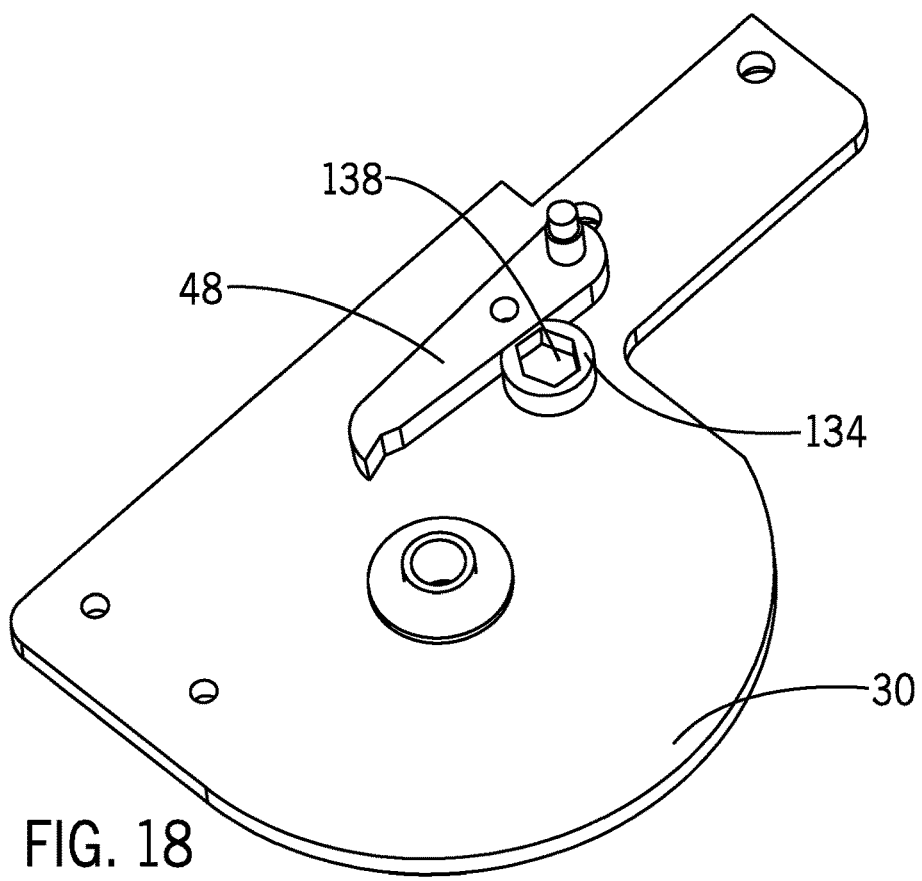
FIG. 18 is a top perspective view of a stop pawl and a cam member positioned to allow the stop pawl to engage a pole advance gear.
Figure 19:
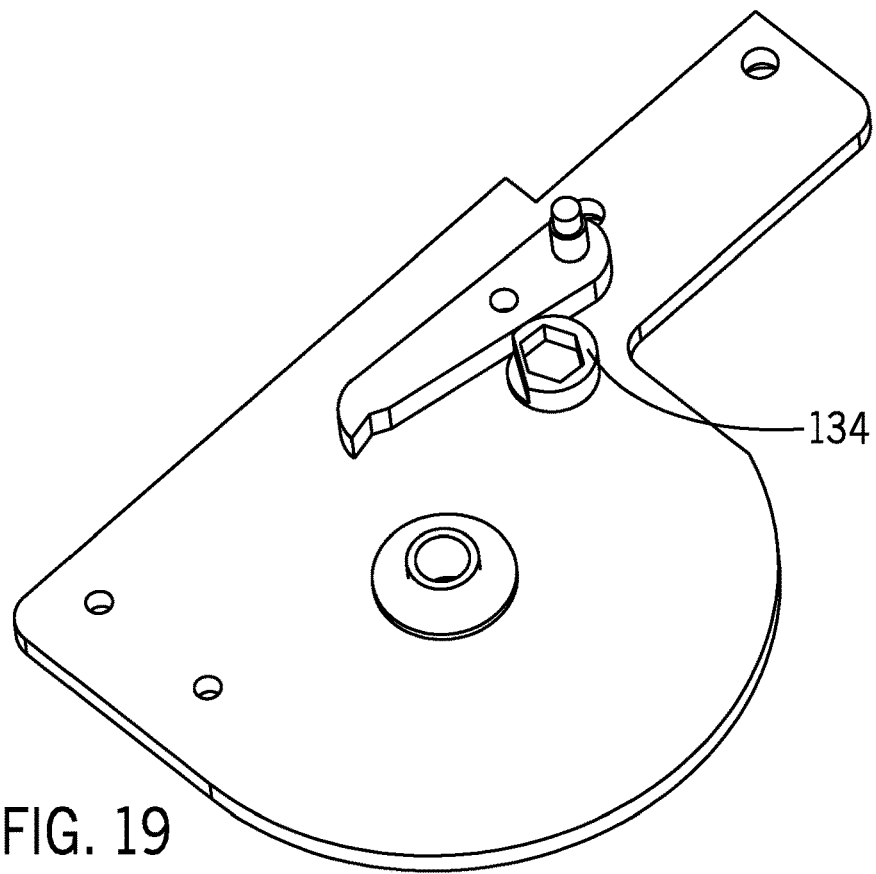
FIG. 19 is a top perspective view of the stop pawl and a cam member in FIG. 18 positioned to not allow the stop pawl to engage the pole advance gear.
Figure 20:
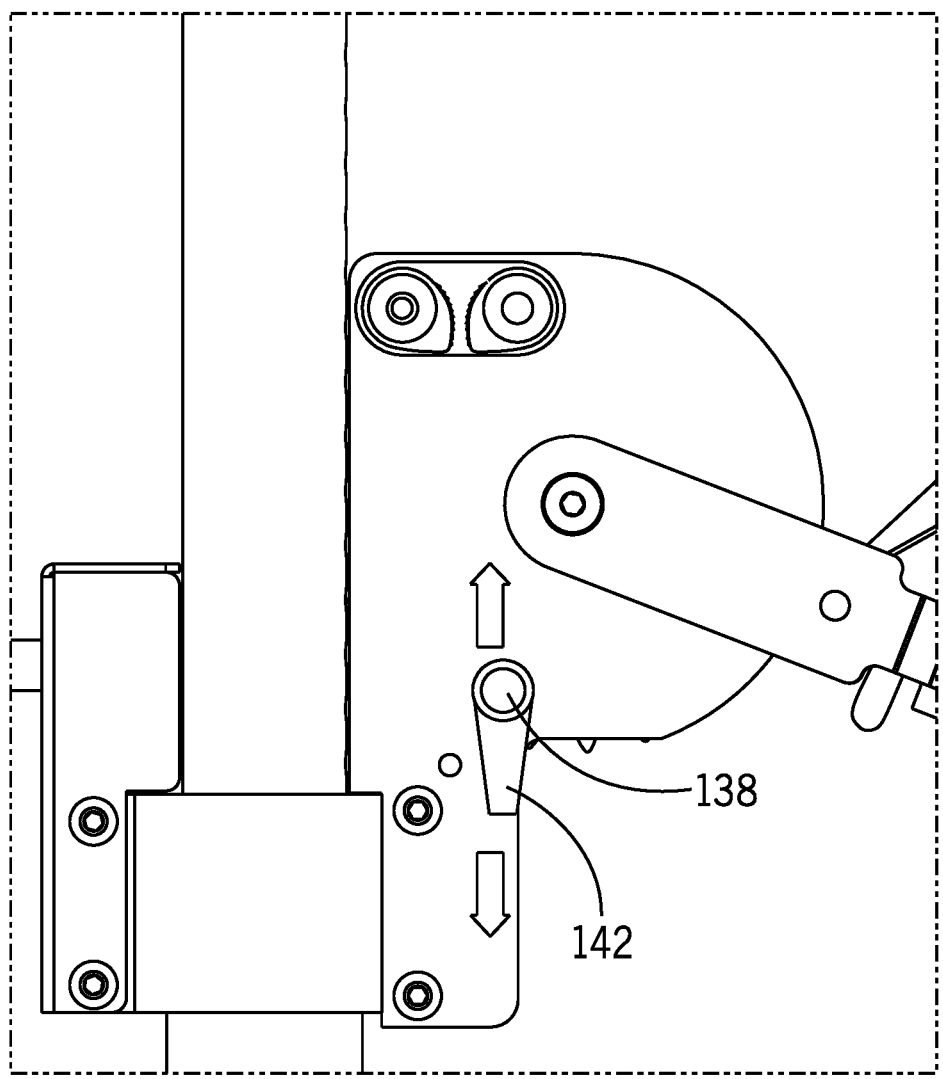
FIG. 20 is a side perspective view of a post and knob connected to the cam member shown in FIGS. 18 and 19.

As illustrated in FIGS. 18, 19 and 20, in an alternate and preferred embodiment, the stop pawl 48 can be movable between pole advance gear engaging and disengaging positions by a cam member 134. The cam member 134 is attached to a post 138 that extends through the side plate 30. On the post 138 is a knob 142, as illustrated in FIG. 20, the knob 142 extending perpendicularly from the post 138. The knob 142 indicates whether the cam member 134 holds the stop pawl 48 (as illustrated in FIG. 19) away from the pole advance gear 56 for movement of the upper tube 34 in a down direction, or whether cam member 134 allows the stop pawl 48 (as illustrated in FIG. 20) to be adjacent the pole advance gear 56 for movement of the upper tube 34 in an up direction.

In operation, an operator will release the brake pad 100 from the upper tube 34, and place the knob 142 in its up position. The operator can then advance the upper tube 34 toward the ceiling. When the operator wishes to lower the upper tube 34, the operator engages the brake pad 100, and then places the knob 142 in the down position. The lever arm 18 can then be rotated away from the pole advance gear 56, and the brake pad 100 released so that the upper tube 34 retracts from the ceiling by gravity.

Also disclosed is a method for engaging a drill trigger 150 on the drill 12 as it is advanced toward the ceiling 11 with the drill apparatus 10. The drill includes the drill trigger positioned near the upper tube 34 by a drill support 152 for holding the drill 12, the drill support 152 being mounted on the upper tube 34.

The method includes the steps of: providing a strand 154 looping over the drill trigger 150, so that the strand 154 extends toward the lower tube 36. The strand 154 is attached to the lower tube 36 to secure the strand 154 against movement towards the drill 12, so that the drill trigger 150 is depressed by the strand 154 when then the upper tube 34 moves relative to the lower tube 36 and towards the ceiling 11. The strand has incorporated therein a tension spring 155, so that a uniform depression force can be applied to the drill trigger over a substantial travel distance. More particularly, in the disclosed embodiment, the tension spring 155 is between the two ends of the strand 154, but in other embodiments (not shown), the tension spring can be at an end of the strand.

Figure 21:
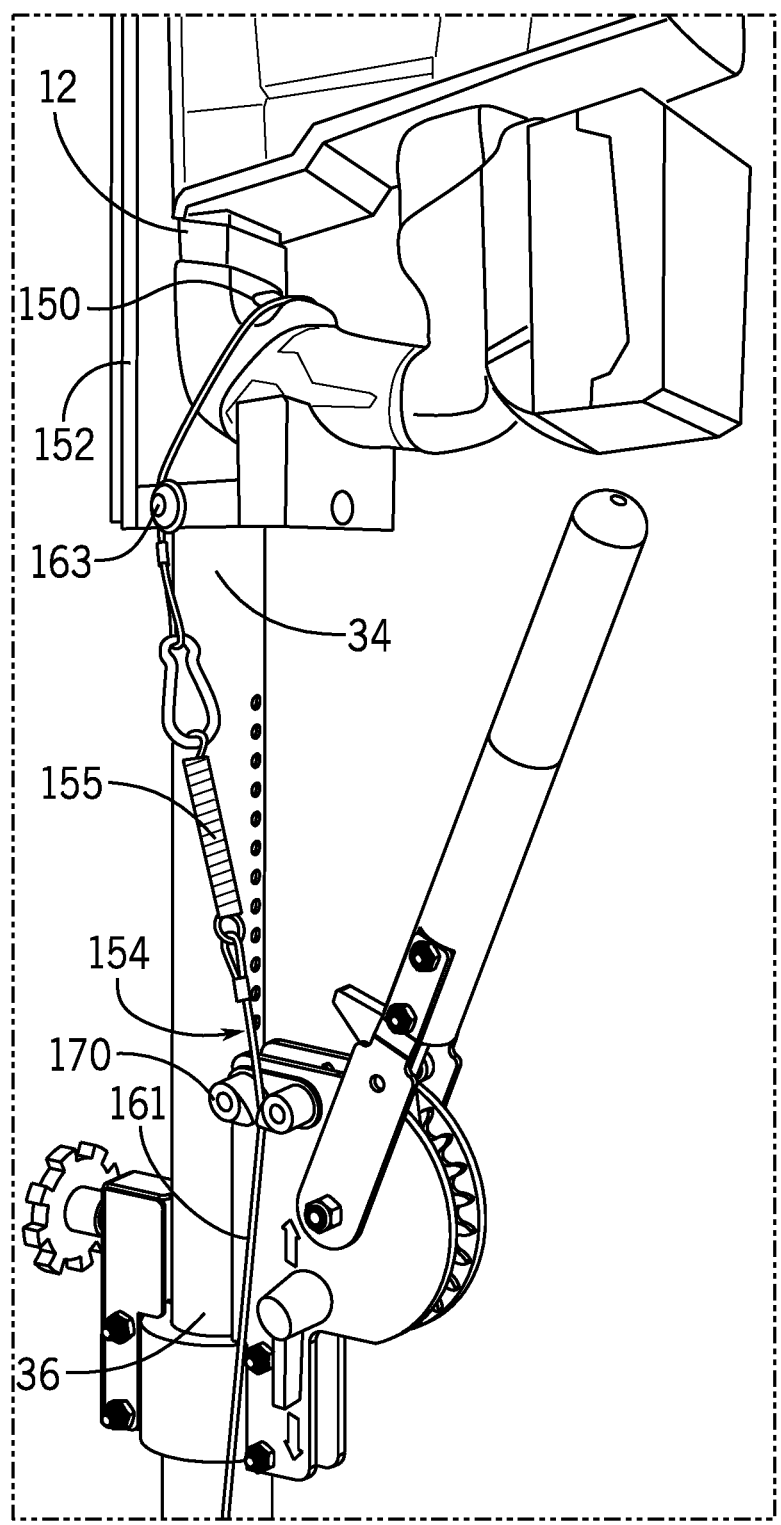
FIG. 21 is a side perspective view of a drill in a drill support attached to the overhead drilling apparatus, illustrating a method for engaging a drill trigger on a drill as it is advanced toward a ceiling with a drill apparatus.
Figure 22:
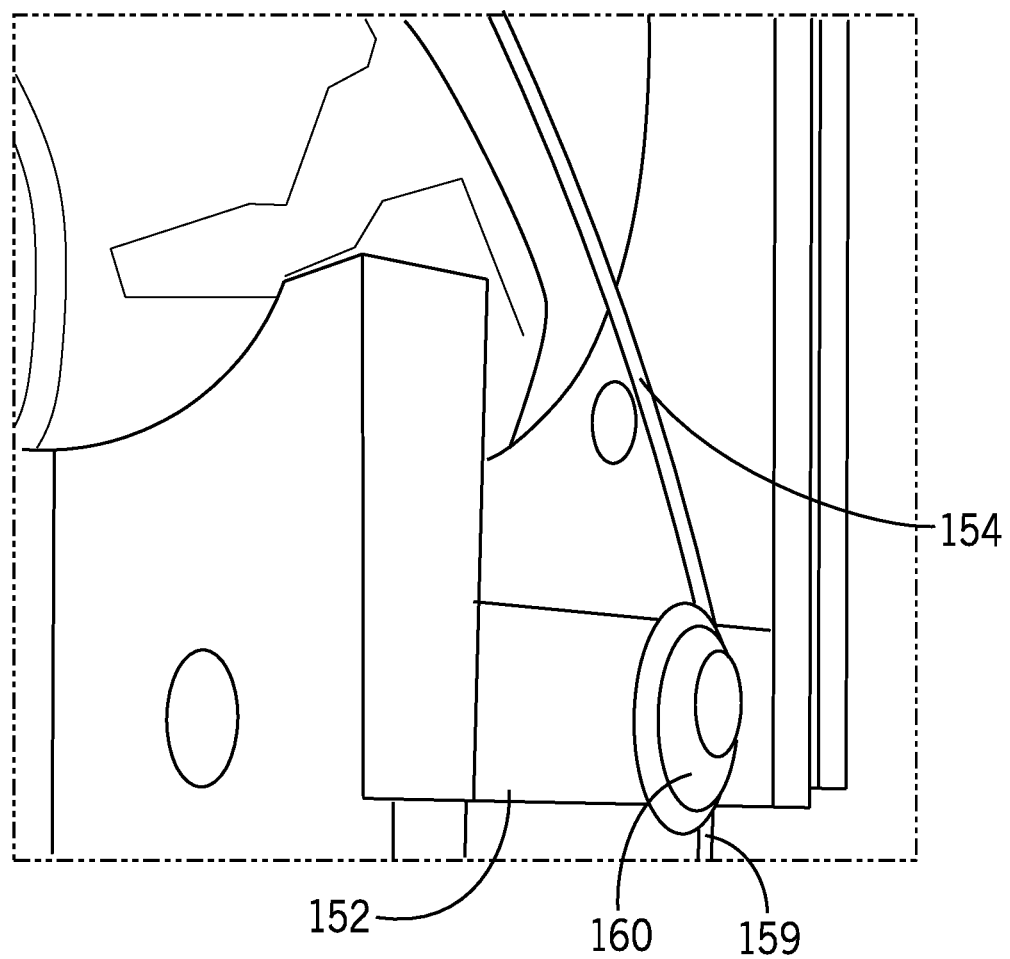
FIG. 22 is a side perspective view of a strand connected to the drill support on the opposite side of the drill support illustrated in FIG. 21.

In the disclosed embodiment, the strand 154 is looped over the drill trigger 150 by having one end 159 of the strand 154 attached to the drill support 152 by a first button 160, as shown in FIG. 22, and another end 161 of the strand 154 attached to the outer tube 36, as shown in FIG. 21. In other embodiments (not shown), both ends of the strand can be attached to the lower tube 36. The strand 154 is guided around the drill trigger 150 by a second button 163 which permits the strand 154 to slide around the second button 163.

In the disclosed embodiment, the end of the strand 161 attached to the upper tube 34 is captured between a pair of rotating cam teeth 170 that capture the strand 154 between the teeth 170 when the stand 154 moves relative to the rotating cam teeth 170 in one direction, but which release the strand 154 from between the rotating cam teeth 170 when the strand 154 moves relative to the rotating cam teeth 170 in an opposite direction.

Various other features of the apparatus are set forth in the following claims.

The invention claimed is:

1. A drill apparatus including
   an upper tube,
   a lower tube slidably telescopic with the outer tube, the lower tube having an upper portion,
   a support collar attached to the lower tube upper portion, and
   a pole extension mechanism, the pole extension mechanism comprising:
   a pole advance gear having pole advance gear teeth,
   a drive gear having drive gear teeth, the drive gear being coaxial with and fixedly attached to the pole advance gear so that the two gears rotate together, the pole advance gear and drive gear being rotatably mounted on the support collar,
   the pole advance gear teeth being received in aligned spaced apart apertures in the upper tube, the apertures being adapted to mate with the pole advance gear teeth,
   a lever arm having an end pivotally mounted on the support collar at a lever arm pivot point coaxial with the drive gear and the pole advance gear,
   a stop pawl pivotally mounted on the support collar for rotation between where the stop pawl engages the drive gear and prevents downward movement of the pole upper tube relative to the pole lower tube, and where the stop pawl does not engage the drive gear, and a drive pawl piece pivotally mounted on the lever arm near the lever arm end, the drive pawl piece having a drive pawl adapted to engage the drive gear teeth when moved relative to the drive gear in one direction and to disengage the drive pawl teeth when moved relative to the drive gear in an opposite direction, so that rotation of the lever arm in one direction causes rotation by the drive pawl of the drive gear and rotation of the pole advance gear, thus advancing the upper tube relative to the lower tube via the pole advance gear teeth, and so that pivoting of the lever arm in an opposite direction allows for the drive pawl to freely move over the drive gear, and where movement of the lever arm in the one direction causes the drive pawl to engage the drive gear.

2. The drill apparatus according to claim 1 wherein the one direction is towards the lower tube, and wherein the opposite direction is away from the lower tube.

3. The drill apparatus according to claim 1 wherein the support collar has a shoulder adjacent the drive pawl device, and wherein the drive pawl device has an extension that engages the support collar shoulder when the lever arm is adjacent the lower tube, so that when the drive pawl piece rotatably mounted on the lever arm contacts the shoulder on the support collar when the lever arm is brought down to where it is adjacent to the lower tube, an end of the drive pawl that engages the drive gear moves away from the drive gear, allowing for the free rotation of the coaxial drive gear and pole advance gear, the drive pawl engaging the stop pawl and moving the stop pawl away from the drive gear.

4. The drill apparatus according to claim 1 wherein the lever arm, pole advance gear and drive gear are attached to the support collar by a pair of spaced apart side plates.

5. The drill apparatus according to claim 4 wherein the lever arm is attached to the support plates by spaced apart arm attachment brackets attached to an end of the lever arm.

6. The drill apparatus according to claim 1 wherein the pole extension mechanism further includes a friction pad on a lever arm pin upon which the lever arm pivots, the friction pad being between the pole advance gear and the side plate.

7. The drill apparatus according to claim 1 wherein the pole extension mechanism further includes a stop pawl pin release mechanism comprising a pin attached to the stop pawl that extends through a slot in a side plate, movement of the pin away from the drive gear moving the stop pawl away from the drive gear to permit free rotation of the drive gear.

8. The drill apparatus according to claim 1 wherein the end of the drive pawl adjacent the drive gear is biased towards the drive gear by a drive pawl bias spring mounted on a drive pawl pivot pin and between the drive pawl and the support collar.

9. The drill apparatus according to claim 1 wherein the end of the stop pawl adjacent the drive gear is biased towards the drive gear by a stop pawl bias spring mounted on a stop pawl peg and between the stop pawl and the support collar.

10. The drill apparatus according to claim 1 wherein the stop pawl is mounted on the support collar via the stop pawl peg received in a peg slot in one of the side plates.

11. The drill apparatus according to claim 1 wherein the upper tube is an inner tube and the lower tube is an outer tube.

12. A drill apparatus including
an inner tube,
an outer tube slidably received within the outer tube, the outer tube having an upper portion,
a support collar attached to the outer tube upper portion, and
a pole extension mechanism, the pole extension mechanism comprising:
a pole advance gear having pole advance gear teeth,
a drive gear having drive gear teeth, the drive gear being coaxial with and fixedly attached to the pole advance gear so that the two gears rotate together, the pole advance gear and drive gear being rotatably mounted on the support collar,
the pole advance gear teeth being received in aligned spaced apart apertures in the outer tube, the apertures being adapted to mate with the pole advance gear teeth,
a lever arm having an end pivotally mounted on the support collar at a lever arm pivot point coaxial with the drive gear and the pole advance gear,
a stop pawl pivotally mounted on the support collar for rotation between where the stop pawl engages the drive gear and prevents downward movement of the pole inner tube relative to the pole outer tube, and where the stop pawl does not engage the drive gear, and
a drive pawl piece pivotally mounted on the lever arm near the lever arm end, the drive pawl piece having a drive pawl adapted to engage the drive gear teeth when moved relative to the drive gear in one direction and to disengage the drive pawl teeth when moved relative to the drive gear in an opposite direction,
so that rotation of the lever arm in one direction causes rotation by the drive pawl of the drive gear and rotation of the pole advance gear, thus advancing the inner tube relative to the outer tube via the pole advance gear teeth, and
so that pivoting of the lever arm in an opposite direction allows for the drive pawl to freely move over the drive gear, and where movement of the lever arm in the one direction causes the drive pawl to engage the drive gear,
wherein the support collar has a shoulder adjacent the drive pawl device, and wherein the drive pawl device has an extension that engages the support collar shoulder when the lever arm is adjacent the outer tube, so that when the drive pawl piece rotatably mounted on the lever arm contacts the shoulder on the support collar when the lever arm is brought down to where it is adjacent to the outer tube, an end of the drive pawl that engages the drive gear moves away from the drive gear, allowing for the free rotation of the coaxial drive gear and pole advance gear, the drive pawl engaging the stop pawl and moving the stop pawl away from the drive gear, and
wherein the pole extension mechanism further includes a friction pad on a lever arm pin upon which the lever arm pivots, the friction pad being between the pole advance gear and the side plate, and
wherein the pole extension mechanism further includes a stop pawl pin release mechanism comprising a pin attached to the stop pawl that extends through a slot in a side plate, movement of the pin away from the drive gear moving the stop pawl away from the drive gear to permit free rotation of the drive gear, and
the end of the drive pawl adjacent the drive gear is biased towards the drive gear by a drive pawl bias spring mounted on a drive pawl pivot pin and between the drive pawl and the support collar, and the end of the stop pawl adjacent the drive gear is biased towards the drive gear by a stop pawl bias spring mounted on a stop pawl peg and between the stop pawl and the support collar.

* * * * *